United States Patent [19]

Hoffman et al.

[11] Patent Number: 5,017,739

[45] Date of Patent: May 21, 1991

[54] JACKET FOR CABLE CONNECTOR

[75] Inventors: Mark R. Hoffman, Barrington; Charles Y. M. Choi, Highland Park; Peder M. Pedersen, Elmhurst; Niels C. Pedersen, Jr., Spring Grove, all of Ill.

[73] Assignee: HD Electric Company, Deerfield, Ill.

[21] Appl. No.: 549,971

[22] Filed: Jul. 9, 1990

[51] Int. Cl.⁵ .................. H02G 15/113; H01R 4/70
[52] U.S. Cl. .................................. 174/138 F; 174/92
[58] Field of Search ............... 174/71 R, 72 R, 87, 174/92, 138 F; 439/135, 367, 369, 521, 528, 687, 718, 731, 892

[56] References Cited

U.S. PATENT DOCUMENTS

| | | | |
|---|---|---|---|
| D. 180,353 | 5/1957 | Benson | 174/92 X |
| 3,079,459 | 2/1963 | Abbott | 174/91 |
| 3,144,506 | 8/1964 | Gunthel, Jr. | 174/92 X |
| 3,325,591 | 6/1967 | Wahl | 174/92 X |
| 3,654,588 | 4/1972 | Ruth | 174/91 X |
| 4,449,015 | 5/1984 | Hotchkiss et al. | 174/138 F |
| 4,643,505 | 2/1987 | House et al. | 439/369 |
| 4,749,363 | 6/1988 | Luska et al. | 439/367 |

FOREIGN PATENT DOCUMENTS 1224522 2/1960 France .................. 174/71 R

Primary Examiner—Laramie E. Askin
Attorney, Agent, or Firm—Emrich & Dithmar

[57] ABSTRACT

A cable connector jacket formed of flexible, electrically insulating plastic is of unitary, one-piece construction, including two cavity-defining bodies hingedly interconnected in a clamshell-type configuration for movement between open and closed conditions. Each body has two pairs of channel-like tapered arms respectively extending in opposite directions therefrom generally parallel to the hinge line. When the bodies are in their closed conditions, the cavities define a chamber for accommodating the cable connector, and the arms of one body respectively mate with those of the other body to form four tapered tubes for respectively accommodating cable portions interconnected by the connector. A latch on the body holds the jacket closed.

11 Claims, 2 Drawing Sheets

JACKET FOR CABLE CONNECTOR

BACKGROUND OF THE INVENTION

1. Field of the Invention

The present invention relates to protective coverings for electrical connectors, particularly coverings of the type which cover a connector and uninsulated portions of conductors interconnected thereby.

2. Description of the Prior Art

It is known to provide various types of enclosures for electrical connectors. Such enclosures may serve to prevent accidental or unintended contact with electrically conductive connectors by persons such as repair or service personnel or users of associated equipment. In the case of outdoor connectors, such enclosures may serve to protect the connection from the elements.

The present invention has particular application to electrical connectors used in electrical power distribution systems, such as overhead power lines. Prior jackets or coverings have been of a number of different types. Tubular or cylindrical coverings have been used to cover splices or other types of connections between coaxial or in-line cable portions. But these types of coverings are not suitable for branch-type connections. Furthermore, some in-line connector jackets include two portions which must be threadedly engaged, so that they must be applied to the associated conductors before they are joined by the connector. It is known to provide clamshell-type jackets which include two hinged portions which close over a connector so that they can be applied to the connector after it has been connected to its associated in-line cable portions. But these jackets have not been suitable for use with non-coaxial connections or connections of more than two cable portions.

It is also known to provide connector covers which can be used with a connector joining two non-coaxial cable portions, but such coverings have comprised multiple separate members which must be interconnected. Furthermore, prior such coverings have not been suitable for use with connectors interconnecting multiple cable portions.

SUMMARY OF THE INVENTION

It is a general object of the present invention to provide an improved jacket for a cable connector which avoids the disadvantages of prior jackets while affording additional structural and operating advantages.

An important feature of the invention is the provision of a jacket of the type set forth which is suitable for use with a cable connector interconnecting two non-coaxial portions of cable.

Another feature of the invention is the provision of a jacket of the type set forth which is suitable for use with a connector interconnecting more than two cable portions.

In connection with the foregoing features, yet another feature of the invention is the provision of a jacket of the type set forth which is of simple and economical construction.

A further feature of the invention is the provision of a jacket of the type set forth which is usable with connectors interconnecting cables of different sizes.

These and other features of the invention are attained by providing a jacket for a cable connector interconnecting two non-coaxial portions of cable, comprising: a first body defining a first cavity, two non-coaxial arms extending from the first body, a second body defining a second cavity, two non-coaxial arms extending from the second body, and means for securing the first and second bodies together in a closed condition respectively disposable on opposite sides of the cable connector wherein the first and second cavities cooperate to define a chamber for accommodating the cable connector therein, the arms of the first body respectively cooperating with the arms of the second body in the closed condition for defining tubes respectively encircling the cable portions when the cable connector is disposed in the chamber.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of, the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
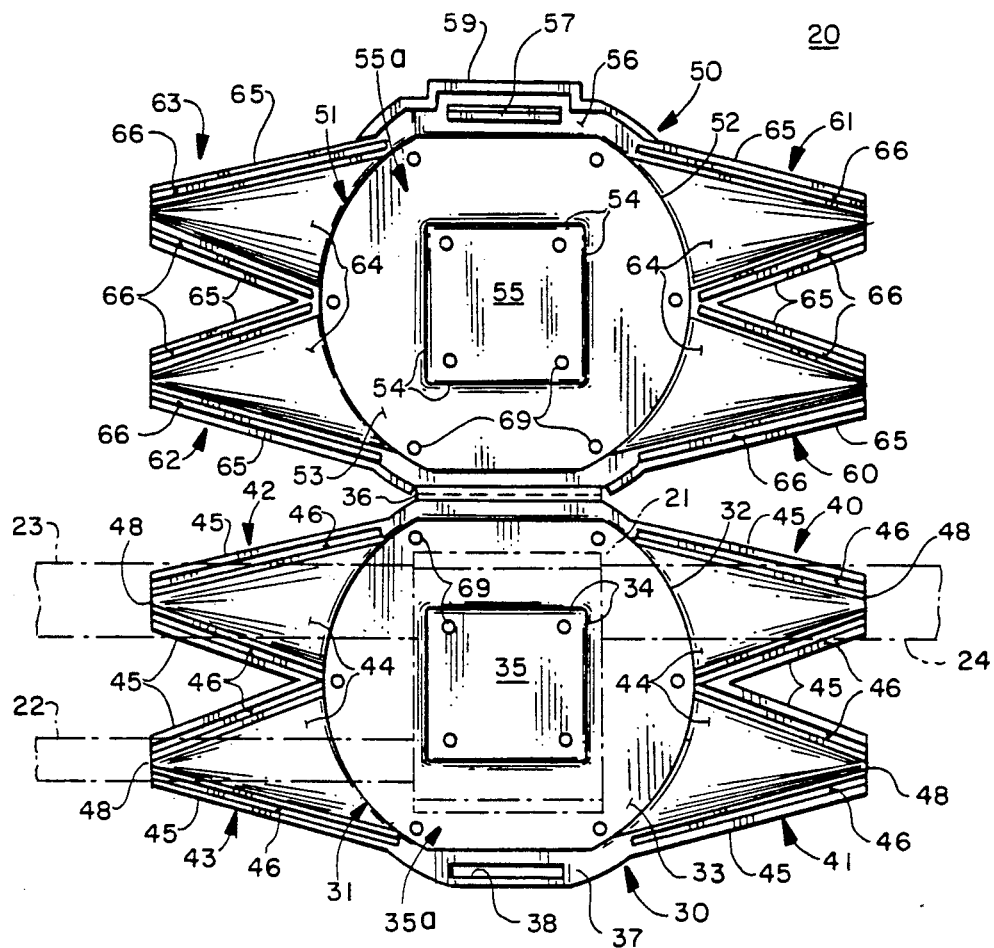
FIG. 1 is a bottom plan view of a jacket constructed in accordance with and embodying the features of the present invention, in its fully open condition, and illustrating the orientation with respect thereto of an associated cable connector.
Figure 2:
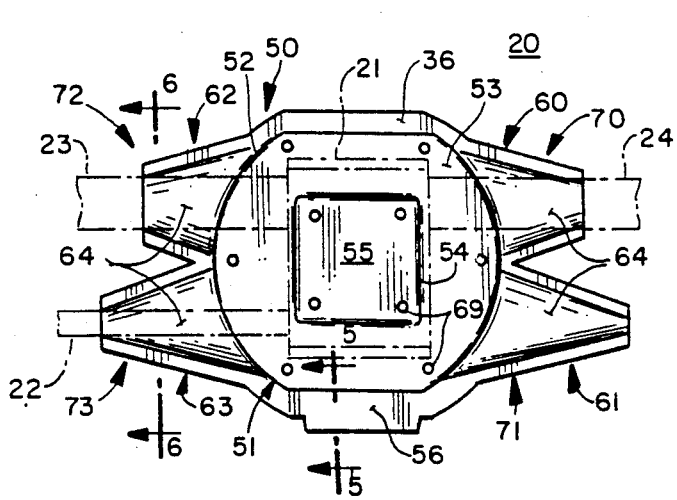
FIG. 2 is a reduced top plan view of the jacket of FIG. 1, in its closed condition, illustrating its orientation with respect to the associated cable connector, and showing portions of the jacket arms cut off to accommodate the associated cable portions.
Figure 3:
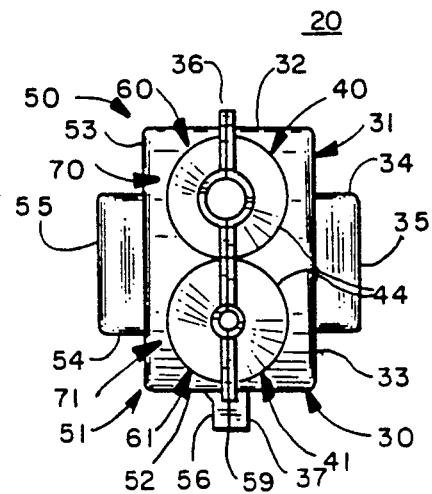
FIG. 3 is an end elevational view of the jacket of FIG. 2, as viewed from the right-hand end thereof.

Referring to FIGS. 1–3, there is illustrated a jacket, generally designated by the numeral 20, constructed in accordance with and embodying the features of a first embodiment of the present invention. The jacket 20 is adapted to enclose and cover a cable connector 21 and adjacent parts of the interconnected cable portions 22, 23 and 24. The cable connector 21 is of the type utilized for forming branch-type connections in conductors such as electrical power distribution cables.

Figure 8:
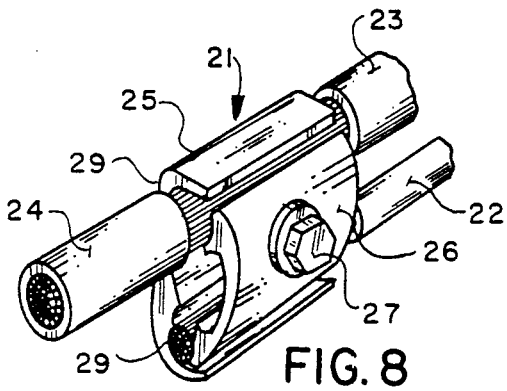
FIG. 8 is a fragmentary, rear perspective view of the cable connector and associated cable portions of the type with which the jacket of FIG. 1 is used.

Referring to FIG. 8, the cable connector 21 is a clamp-connector including a rear clamp 25 which defines two cable-receiving channels, and a front clamp 26 which mates with the rear clamp 25, being secured thereto by an associated bolt 27 for securely clamping the associated cable portions in the respective channels. For purposes of illustration, the connector 21 is shown interconnecting a relatively small-diameter cable portion 22, such as the type used for delivering power from a distribution line to a residential house or the like, with portions 23 and 24 of a relatively large-diameter distribution cable. The cable connector 21 is formed of an electrically conductive material, such as a suitable metal, and the insulation is removed from the portions 29 of the interconnected cables which rest in the cable connector channels for good electrical connection. In the illustrated configuration, the portions 23 and 24 of the large-diameter cable are parts of a continuous cable, while the smaller-diameter cable portion 22 is in the nature of a spur or branch which is tapped off of the larger-diameter cable by means of the cable connector 21.

Referring again to FIGS. 1-3, the jacket 20 has a generally clamshell-type arrangement comprising a female half 30 and a male half 50 interconnected by a hinge portion 36 in a unitary, one-piece construction, formed of a flexible, electrically insulating material, which is preferably a suitable plastic, such as high density polyethylene. The female half 30 includes a central body 31 including a circularly cylindrical wall 32 closed at one end by a generally circular end wall 33 having a square recess formed centrally thereof, which is defined by side walls 34 and an end wall 35, thereby to define a stepped cavity 35a having a large cylindrical cavity portion and a smaller square cavity portion communicating therewith. The cylindrical side wall 32 is flattened at one side and the outer or open edge thereof is integral with the hinge portion 36. The opposite side of the side wall 32 is also flattened and is integral at its outer or open edge with a laterally outwardly extending flange 37 in which is formed a rectangular slot 38. The outer side of the slot 38 is chamfered or beveled along its inner and outer edges, as at 39, as can best be seen in FIG. 5.

Figure 6:
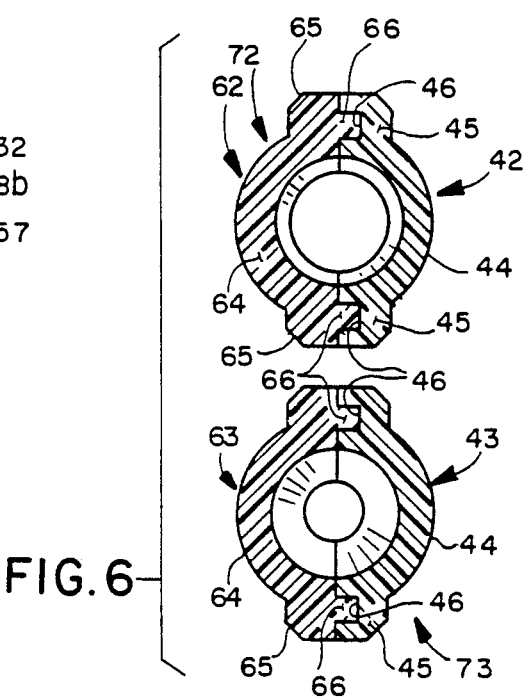
FIG. 6 is an enlarged view in vertical section taken along the line 6—6 in FIG. 2.

Integral with the side wall 32 and projecting outwardly therefrom are four arms 40, 41, 42, and 43, which are substantially channel-shaped and communicate with the cavity 35a. The arms 40-43 are arranged in two pairs, respectively extending in opposite directions from the body 31, generally parallel to the hinge portion 36. More specifically, the arms 40 and 42 are arranged substantially coaxially along an axis which is substantially parallel to the hinge portion 36, and the arms 41 and 43 are arranged substantially coaxially along an axis which is substantially parallel to the hinge portion 36. Each of the arms 40-43 is tapered from a relatively wide end contiguous with the body 31 to a relatively narrow distal end 48 so as to define a generally semi-conical side wall 44. Referring also to FIG. 6, it can be seen that each of the side walls 44 is integral respectively along the entire length of its free edges with laterally outwardly extending flanges 45, each of the flanges 45 having formed therein a shallow groove 46 extending substantially the length thereof and being substantially rectangular in transverse cross section.

The male half 50 is substantially a mirror image of the female half 30, having a body 51, including a generally cylindrical side wall 52, closed at one end by an end wall 53 which has a substantially square recess centrally thereof defined by side walls 54 and an end wall 55.

Thus, the body 51 defines a stepped cavity 55a including an enlarged cylindrical cavity portion and a substantially square cavity portion. The side wall 52 is flattened along a portion thereof which is unitary at its open or outer edge with the hinge portion 36. A diametrically opposite portion of the side wall 52 is also flattened and is integral at its open or outer edge with a laterally outwardly extending flange 56. Projecting from the flange 56 is an upstanding finger 57, provided at its distal end with a hook 58 projecting outwardly therefrom substantially normal thereto, and provided with sloping cam surfaces 58a and 58b (see FIG. 5). Integral with the flange 56 along the outer periphery thereof and projecting therefrom in the same direction as the finger 57 is a lip flange 59. A slot 59a is formed through the flange 56 adjacent to the base of the finger 57, to facilitate flexibility of the parts.

The body 51 is provided with four arms 60, 61, 62 and 63, each of which is generally channel-shaped and communicates with the cavity 55a. Each of the arms 60-63 is tapered from a relatively wide end contiguous with the side wall 52 to a narrow distal end, each arm being defined by a generally semi-conical wall 64. Referring to FIGS. 1 and 6, each of the walls 64 is integral at its free edges with laterally outwardly extending flanges 65. Each of the flanges 65 extends the entire length of the associated arm and is provided along its entire length with an upstanding rib or tongue 66, substantially rectangular in transverse cross section. The arms 60 and 62 are disposed coaxially with each other along an axis which is disposed substantially parallel to the hinge portion 36, and the arms 61 and 63 are similarly disposed coaxially with each other along an axis substantially parallel to the hinge portion 36.

From the foregoing, it can be seen that the jacket 20 is bilaterally symmetrical with respect to a plane which is perpendicular to the axes of the arms 40-43 and 60-63 and passes through the centers of the bodies 31 and 51. A plurality of weep holes 69 are preferably provided in the walls 33, 35, 53 and 55 to facilitate drainage of moisture from the cavities 35a and 55a.

In use, the jacket 20, in its open condition, is fitted over the cable connector 21. More specifically, the cable connector 21 is fitted in the cavity 35a of the female half 30 with the flange 37 directed downwardly and with the interconnected cable portions 22-24 respectively disposed in corresponding ones of the arms 40-43. In the configuration illustrated in FIGS. 1 and 2, the small-diameter cable portion 22 is disposed in arm 43, while the larger-diameter cable portions 23 and 24 are respectively disposed in the arms 42 and 40.

It is a significant aspect of the present invention that the jacket 20 can be readily adapted to accommodate a variety of different-diameter cables and connectors. In the illustrated configuration, the cable portion 22 has a diameter which is slightly less than the diameter of the narrow distal end of the arm 43, so that it can be readily accommodated in the arm 43 without modification. However, the cable portions 23 and 24 have a diameter which is substantially greater than the diameter of the narrow distal ends of the arms 40 and 42. Accordingly, the outer ends of the arms 40 and 42 are cut off with a knife or other suitable cutting instrument at a location along their length where the inner diameter of the arms will just accommodate the cable portions 23 and 24. In like manner, the mating arms 61 and 63 of the male half 50 are similarly cut off.

Figure 5:
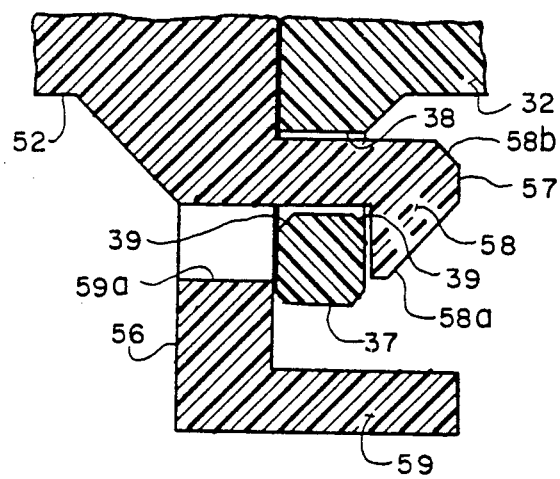
FIG. 5 is an enlarged, fragmentary view in vertical section taken along the line 5—5 in FIG. 2.

Then the male half 50 is folded over the front of the cable connector 21 to the closed condition illustrated in FIGS. 2 and 3. In this condition, the ribs or tongues 66 on the arms 60-63 are press fitted into the grooves 46 on the corresponding ones of the arms 40-43, and the hook 58 of the finger 57 is snap-fitted through the slot 38 to latch the jacket in its closed condition, as illustrated in FIG. 5. In this regard, it will be appreciated that the latching of the parts is facilitated by a camming engagement of the sloping cam surfaces 58a and 58b on the hook 58 with the chamfer 39 on the outer edge of the slot 38, and by the flexibility and resilience of the parts. In the closed condition, the lip flange 59 extends down over and encompasses the flange 37 to protect the latch and provide a weather-proof covering therefor. The outer or open edges of the bodies 31 and 51 abut tightly against each other, as illustrated in FIG. 3.

It will also be appreciated that, in the closed condition of the jacket 20, the bodies 31 and 51 cooperate to define a closed chamber for the cable connector 21, while the arms 60-63 respectively cooperate with the arms 40-43 to define four closed tubes 70-73, three of which are utilized to accommodate cable portions in the configuration illustrated in FIGS. 1 and 2. Thus, it can be seen that the jacket 20 affords a substantially weather-proof covering for the cable connector 21 and the bare portions of the cables interconnected thereby, as well as providing an electrically insulating covering which prevents persons from accidentally contacting the cable connector 21.

Figure 4:
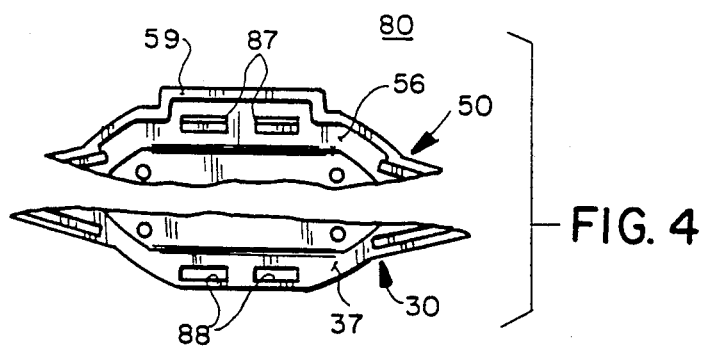
FIG. 4 is a fragmentary view, similar to FIG. 1, with portions removed, of an alternative embodiment of the jacket of FIG. 1.

Referring now also to FIG. 4, there is illustrated an alternative embodiment 80 of the jacket of the present invention, which is substantially identical to the jacket 20 with the exception of the latching mechanism. In the jacket 80, the flange 37 contains two slots 88, while the flange 56 contains two fingers 87 adapted to engage in the slots 88.

Figure 7A:
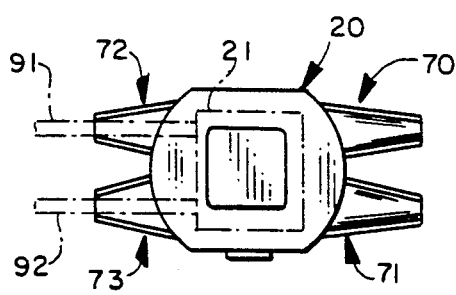
FIGS. 7A–7C are reduced diagrammatic views of the jacket of FIG. 1, illustrated as arranged for use with alternative cable configurations.
Figure 7B:
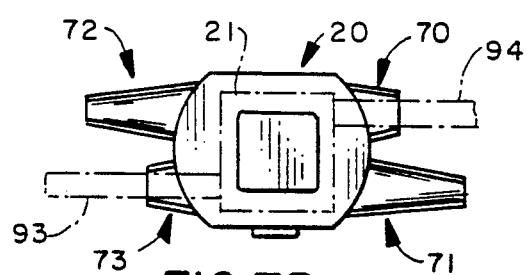
Figure 7C:
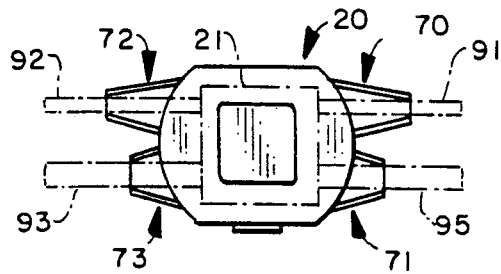

It will be appreciated that the jacket of the present invention can be utilized with a variety of different cable configurations, representative ones of which are illustrated in FIGS. 7A-7C. Thus, in FIG. 7A, the jacket 20 is shown closed over a cable connector 21 which interconnects two relatively small-diameter non-coaxial cable portions 91 and 92 which extend from the cable connector 21 in the same direction. In FIG. 7B, the jacket 20 is used with a connector interconnecting two non-coaxial, relatively large-diameter cable portions 93 and 94 which extend in opposite directions. In FIG. 7C, the jacket 20 is used with a cable connector interconnecting four cable portions including coaxial small-diameter cable portions 91 and 92 and coaxial large-diameter cable portions 93 and 95. It will be appreciated that, while in the configuration illustrated with respect to FIGS. 1, 2 and 8, the coaxial cable portions are part of a continuous cable from which a central portion of the insulation has been removed, the coaxial cable portions could also be two free cable ends.

If desired, each of the arms 60-63 may be provided at its distal end with an end tab (not shown) which closes that end of the arm and projects therefrom a predetermined distance above the level of the ribs 66. Alternatively, the jacket could be formed originally with one or more shortened arms. In use, such end tabs 68 would be cut off of any of the arms 60-62 which will accommodate a cable portion, whether or not those arms are shortened. Also, locating or alignment pins (not shown) could be provided at the ends of the flattened portions of the walls 32 and 52 for added stability to prevent undue flexure of the jacket 20 in its closed condition.

From the foregoing, it can be seen that there has been provided an improved jacket for an electrical connector which is of relatively simple and economical construction, which is characterized by ease of assembly and use, which can be used with cable configurations including non-coaxial cable portions and three or more cable portions and which is readily adaptable for use with a variety of different-sized cables.

We claim:

1. A jacket for a cable connector interconnecting as many as four cable portions, comprising: a first body defining a first large cavity, first wall structure projecting from said first body and defining a first small cavity communicating with said first large cavity, two pairs of discrete parallel arms respectively extending from opposite sides of said first body with the arms of one pair being respectively coaxial with the arms of the other pair, a second body defining a second large cavity, second wall structure projecting from said second body and defining a second small cavity communicating with said second large cavity, two pairs of discrete parallel arms respectively extending from opposite sides of said second body with the arms of one pair being respectively coaxial with the arms of the other pair, and means for securing said first and second bodies together in a closed condition respectively disposable on opposite sides of the cable connector wherein said first large and small cavities cooperate with said second large and small cavities to define a stepped chamber for accommodating the cable connector therein, said arms of said first body respectively cooperating with said arms of said second body in said closed condition for defining four discrete tubes for respectively encircling the cable portions when the cable connector is disposed in said chamber.

2. The jacket of claim 1, wherein said bodies and said arms are formed of electrically insulating material.

3. The jacket of claim 2, wherein said electrically insulating material is a flexible plastic material.

4. The jacket of claim 1, wherein each of said arms is tapered from a wide end at the associated body to a narrow distal end.

5. The jacket of claim 1, wherein said securing means includes hinge means interconnecting said first and second bodies and accommodating pivotal movement thereof between an open condition and said closed condition.

6. A jacket for a cable connector interconnecting as many as four cable portions, comprising: a first body defining a first large cavity, first wall structure projecting from said first body and defining a first small cavity communicating with said first large cavity, two pairs of discrete parallel arms respectively extending from opposite sides of said first body with the arms of one pair being respectively coaxial with the arms of the other pair, a second body defining a second large cavity, second wall structure projecting from said second body and defining a second small cavity communicating with said second large cavity, two pairs of discrete parallel arms respectively extending from opposite sides of said second body with the arms of one pair being respectively coaxial with the arms of the other pair, hinge means unitary with an hingedly interconnecting said first and second bodies for movement between an open condition and a closed condition wherein said first body and said arms thereof are respectively disposed in overlapping substantially. congruent contact with said second body and said arms thereof, said first large and small cavities cooperating with said second large and small cavities to define a stepped chamber for accommodating the cable connector therein when said first and second bodies are disposed in said closed condition, said arms of said first body respectively cooperating with said arms of said second body in said closed condition for defining four discrete tubes for respectively encircling the cable portions when the cable connector is disposed in said chamber, and latch means carried by said first and second bodies for securing them in their closed condition.

7. The jacket of claim 6, wherein said hinge means extends along side edges of said first and second bodies, said arms being disposed substantially parallel to said hinge means.

8. The jacket of claim 6, wherein said latch means includes at least one aperture in one of said bodies and finger means carried by the other of said bodies and engageable in said at least one aperture.

9. The jacket of claim 8, wherein said latch means includes a second aperture in said one body and said finger means includes two fingers respectively disposable in said apertures.

10. The jacket of claim 6, and further comprising grooves extending longitudinally of each of said arms on one of said bodies, and tongues extending longitudinally of each of said arms on the other of said bodies, said tongues being respectively receivable in said grooves when said bodies are disposed in their closed condition for holding together the portions of each of said tubes.

11. The jacket of claim 6, wherein each of said arms is tapered from a wide end at the associated body to a narrow distal end.

* * * * *

UNITED STATES PATENT AND TRADEMARK OFFICE
CERTIFICATE OF CORRECTION

PATENT NO. : 5,017,739
DATED : May 21, 1991
INVENTOR(S) : Mark R. Hoffman, et al.

It is certified that error appears in the above-identified patent and that said Letters Patent is hereby corrected as shown below:

Column 6, line 65, "an" should be --and--.

Signed and Sealed this

Eighth Day of September, 1992

Attest:

DOUGLAS B. COMER

Attesting Officer

Acting Commissioner of Patents and Trademarks